United States Patent [19]

Janson

[11] Patent Number: 4,556,258

[45] Date of Patent: Dec. 3, 1985

[54] AXLE CLUTCH ACTUATOR

[75] Inventor: Gunnar H. Janson, Dudley, Mass.

[73] Assignee: Dana Corporation, Toledo, Ohio

[21] Appl. No.: 541,755

[22] Filed: Oct. 13, 1983

[51] Int. Cl.$^4$ .......................... B62D 27/06; B62K 5/06
[52] U.S. Cl. ..................................... 301/128; 301/126; 192/149
[58] Field of Search ............... 301/128, 124 H, 124 R, 301/125, 126; 192/149; 280/87, 92, 62, 69

[56] References Cited

U.S. PATENT DOCUMENTS

| | | | |
|---|---|---|---|
| 1,301,971 | 4/1919 | Reed | 301/128 |
| 1,725,562 | 8/1929 | Borchert | 192/149 |
| 2,902,319 | 9/1959 | Mulder | 301/128 |
| 2,957,566 | 10/1960 | Brown | 192/149 |
| 3,049,209 | 8/1962 | Reece | 192/149 |
| 3,084,776 | 4/1963 | Rabinow | 192/149 |
| 3,203,202 | 8/1965 | Brownyer | 301/128 |
| 4,331,210 | 5/1982 | Petrak | 301/126 |
| 4,452,327 | 6/1984 | Mowat et al. | 301/128 |

*Primary Examiner*—Raymond A. Nelli
*Attorney, Agent, or Firm*—McDonald Frank B.

[57] ABSTRACT

A clutch actuator provides a mechanism by which a wheel may be selectively clutched to an axle for rotation therewith. In a preferred form, the actuator is employed in a wheelchair. An axle flange is fixed to each of a pair of rear axles, and an actuator is fixed to reach rear wheel hub for providing selective operative connection between each rear wheel and respective axle flange. Each actuator includes a housing having a detent. A coupling sleeve is axially movable within the housing and includes a bore registrable with the detent. A spring loaded plunger includes a cam disposed for axial movement within the coupling sleeve, and a ball carried within the bore is releasably retained in the detent by the cam of the plunger. The sleeve includes a transversely extending end disposed for engaging the axle flange for clutching the wheel.

12 Claims, 4 Drawing Figures

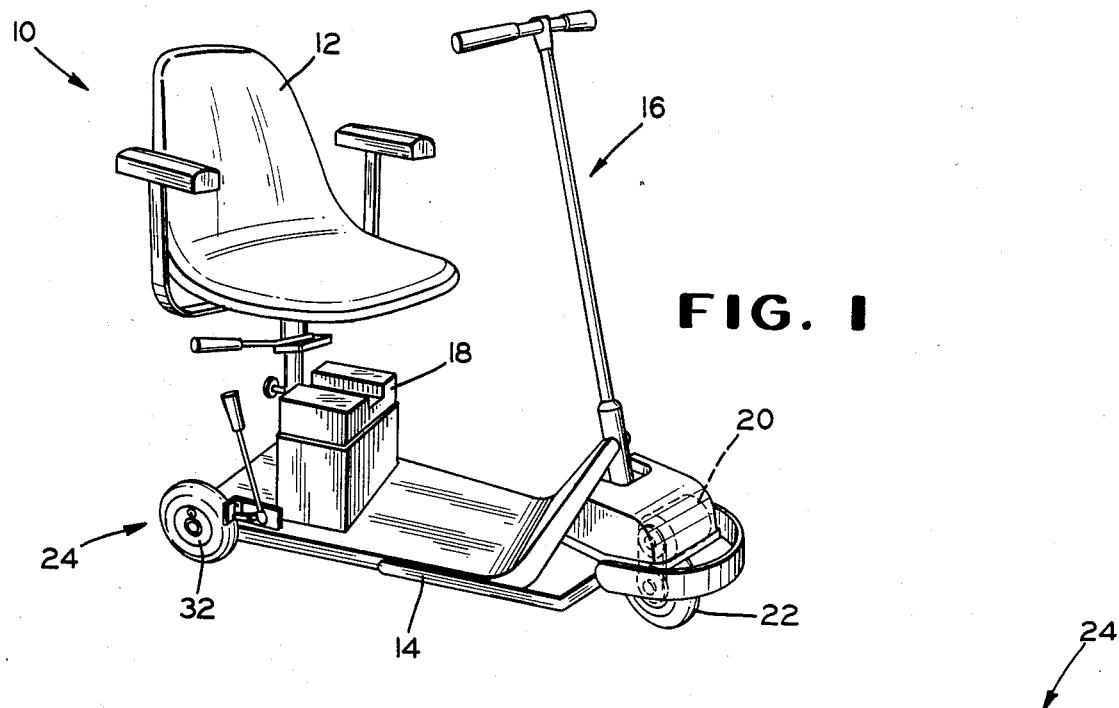
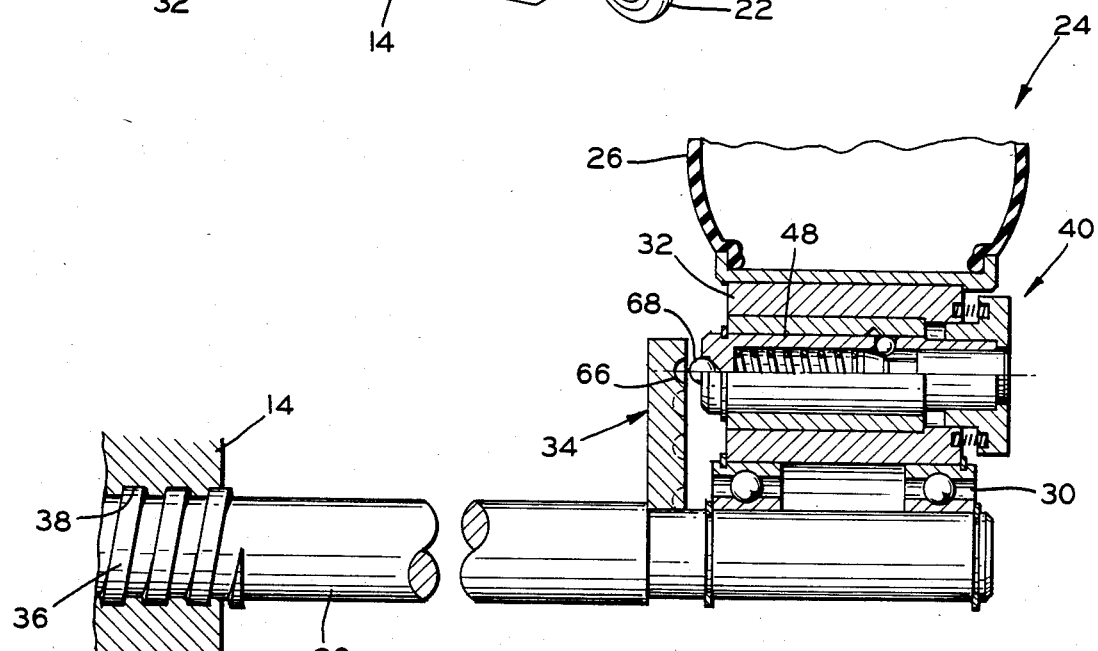
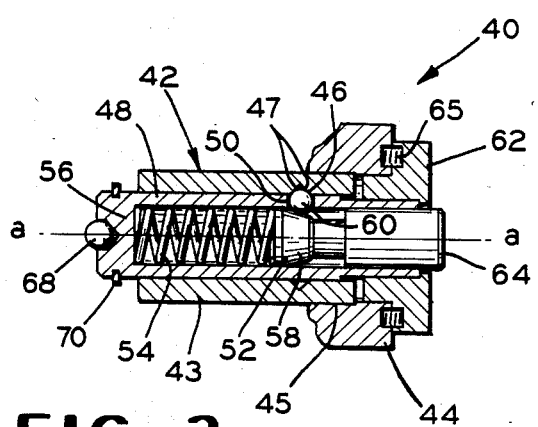
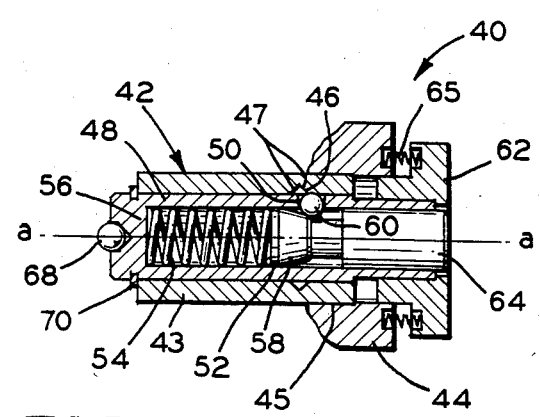

AXLE CLUTCH ACTUATOR

BACKGROUND OF THE INVENTION

This invention relates generally to the operation of small wheeled transportation vehicles for handicapped persons, and particularly to the selective actuation of clutches employed in such vehicles. More particularly, the invention relates to the actuation of clutches associated with wheel assemblies having axially retractable and extensible wheels.

Prior art vehicles for handicapped persons, such as wheelchairs for example, have typically required occupants to be removed from the vehicles when transporting the vehicles through narrow aisles and small door passageways. Most of such vehicles of the prior art, even self-propelled, have not possessed a capacity for reduction in the width dimension thereof while transporting occupants. For example, many wheelchairs are designed for simple collapse along their lateral dimensions for enabling conveyance through narrow spaces.

SUMMARY OF THE INVENTION

The clutch actuator device disclosed and claimed herein provides a mechanism by which opposing wheels of a vehicle for transporting handicapped persons may be retracted together along an axis, and subsequently expanded apart thereon, without necessity for removal of an occupant from the vehicle. In a preferred form, the device is installed on each of a pair of rear wheel assemblies of a wheelchair, wherein selective actuation of the device may be controlled by the occupant of the wheelchair. Each wheel assembly includes a hub rotatably mounted on an axle, wherein the axle includes an axle flange. Each actuator includes a housing affixed to one wheel hub. The housing includes a detent, and holds a coupling sleeve axially movable therein, the sleeve having a bore registrable with the detent. A spring loaded plunger within the coupling sleeve includes a cam disposed for axial movement, and a ball carried within the bore is releasably urged into the detent by the cam of the plunger. The sleeve includes a transversely extending inboard end which, while the ball is held in the detent by the plunger, is disposed for engaging the axle flange, and thereby for clutching the wheel.

BRIEF DESCRIPTION OF THE DRAWINGS

FIG. 1 is a perspective view of a self-propelled tricycle vehicle for transporting handicapped occupants;

FIG. 2 is a fragmentary cross sectional view of one of the rear wheel assemblies of the vehicle of FIG. 1;

FIG. 3 is a cross sectional view of a preferred embodiment of the clutch actuator of the present invention, shown in an engaged position; and FIG. 4 is a cross sectional view of the same actuator shown in a disengaged position.

DETAILED DESCRIPTION OF A PREFERRED EMBODIMENT

Referring first to FIG. 1, a wheeled vehicle 10 designed for transportation of handicapped persons includes a seat 12 affixed to a frame 14, and provides steering apparatus 16 for manual control by an operator-occupant. A power supply 18, of electromotive nature in the preferred embodiment, empowers a motor drive 20 situated over the front wheel 22 and drivingly engaged therewith. A pair of rear wheel assemblies 24 (only one of which is shown in FIG. 1) are non-driving, and each includes a clutch actuator device constructed in accordance with the present invention.

Referring now to FIG. 2, one of the pair of wheel assemblies 24 is shown in cross-sectional detail. Each assembly 24 includes a wheel 26 rotatably supported on an axle 28 by ball bearings 30. Each wheel assembly 24 further includes a wheel hub 32 which contains and supports one clutch actuator device shown generally at 40. The device 40 includes an inboardward end 68 which is disposed for engaging an axle flange 34, the latter being rigidly affixed to the axle 28 for rotation therewith.

At the extreme inboardward end of each axle 28 is a screw threaded portion 36 (for convenience shown broken away from the outboardward end of the axle) which engages a matingly threaded portion 38 of the vehicular frame 14. The threaded portions 38 are designed to carry the entire weight of the vehicle and occupant, and must accommodate retraction and expansion of the wheel assemblies 24, as more particularly described hereinbelow.

Referring now to FIGS. 3 and 4, a preferred embodiment of the clutch actuator device 40 of the present invention is shown in engaged and disengaged positions, respectively. Each device 40 includes an outer housing 42 which extends through and is affixed to one wheel hub 32. The housing 42 defines a cylindrical body 43 which contains a support flange 44 rigidly affixed to the outboardward end thereof. The support flange 44 may be constructed as a separate part bonded at 45 to the cylindrical body portion, as shown, or may alternatively be an integral part of the cylindrical body portion 43.

The housing 42 includes a ball-receiving detent 46 which defines a pair of opposed cam surfaces 47 aligned at approximately 45° with respect to the axis "a—a" of the housing 42. Axially interposed within the housing 42 and slidably movable therein is a coupling sleeve 48 having a bore 50 registrable with the detent 46. Axially aligned within the coupling sleeve 48 is a plunger 52 under constant load by a plunger spring 54 positioned intermediate the plunger 52 and the inboard end 56 of the coupling sleeve 48. The plunger 52 includes a cam surface portion 58 disposed for engagement with a ball 60 carried in the bore 50 of the movable coupling sleeve 48. In the preferred embodiment, there are three sets of bores 50, balls 60, and detents 46, each aligned annularly, one hundred twenty (120) degrees apart from the other. Use of a plurality of the latter members avoids cocking of the sleeve 48 within the housing 42, which may otherwise occur whenever relative forces are not uniformly applied. (For convenience, however, only one of such defined sets will be described.)

It will be appreciated by those skilled in the art that the plunger 52 moves axially relative to the coupling sleeve 48, and that the cam surface portion 58 of the plunger 52 is of course disposed for axial movement relative to the coupling sleeve 48. Moreover, the ball 60, always carried within the bore, is forced into and released from the detent 46 by the cam surface portion 58 of the plunger 52 as the plunger moves axially relative to the coupling sleeve 48. However, for the plunger to urge the ball into the detent, it is necessary that the coupling sleeve be moved into a position wherein the bore 50 comes into registration with the detent 46.

Two separate elements are employed for engagement and release, respectively, of the ball 60 with and from the detent 46. For purposes of axially moving the coupling sleeve 48 to the position wherein the bore 50 is in registration with the detent 46, and whereby the ball will be urged into the detent by the force of the cam surface portion 58 of the plunger, an actuator plate 62 is manually forced inboardwardly against an actuator spring system 65 (FIG. 4) interposed between the actuator plate 62 and the housing support flange 44. On the other hand, for purposes of causing the ball to be released from the detent, a release button 64 is utilized. The button 64 is affixed to the outboard end of the plunger, the button extending axially through the actuator plate, whereby the plunger may be moved inboardwardly relative to the coupling sleeve to permit the ball to be urged out of the detent by means of the cam surfaces 47 of the detent. Thus, it will be seen than an occupant of the vehicle 10 will press the actuator plate 62 or the release button 64 to effect engagement or release, respectively, of the actuator device 40.

Referring back to FIG. 2, the axle flange 34 includes a plurality of detents 66 which are disposed for receiving the inboardward end 68 of the coupling sleeve 48. Thus, it may now be appreciated that although the housing 42 is axially fixed within the hub 32, both the coupling sleeve 48 and the plunger 52 will move independently and relatively with respect to the axially fixed housing 42. Thus, when the clutch actuator device 40 is in the engaged position (as shown in FIG. 3), the inboardward end 68 of the coupling sleeve 48 will engage one of the detents 66 of the axle flange 34, whereby the wheel 26 will be clutched to the axle 28. When wheel and axle are clutched together, rotation of the wheel 26 will result in rotation of the axle 28, whereby the screw threaded portion 36 of the axle 28 will rotate within the matingly threaded portion 38 of the vehicle frame 14, resulting in the axially inward and outward movement of the wheel assembly 24 relative to the frame 14. To the extent that the pair of assemblies 24 normally comprise the lateral limits of the vehicular dimensions, this action enables the lateral profile of the vehicle of FIG. 1 to be made smaller, and to thereby facilitate the conveyance of the vehicle through narrow passages. Upon passage, the retracted wheel assemblies may be re-extended to achieve the normal lateral stability of the vehicle.

Although a number of dimensions will fall within the realm of feasibility in the practice of the present invention, the specific dimensions employed in the successful prototyping hereof were as follows:

Diameter of Rear Wheels—Approximately Six (6) inches

Extended Wheel Base—Approximately Twenty-one (21) inches

Retracted Wheel Base—Approximately Fifteen (15) inches)

In the normally engaged position of the device 40 as shown in FIG. 3, the ball 60 is retained in the detent by the cam surface portion 58 of the plunger 52. The spring force on the ball thus eliminates any need for an axial retention means for the coupling sleeve 48 whenever the coupling sleeve is positioned at its inboardward limit. However, upon release of the ball 60 from the detent, the coupling sleeve is free to be urged rightwardly by the spring means 65 interposed between the plate 62 and flange 44. Under the latter circumstance, a retaining means, such as a washer 70, is needed to retain the coupling sleeve 48 from being urged outboardwardly of the housing 42 via the actuator spring system 65. Thus, referring to FIG. 4, it will be seen that the washer 70 abuts the inboardward end of the housing to hold the coupling sleeve 48 whenever the ball 60 has been released from the detent 46.

During engagement of the device, it is preferable that the threaded portions 36 and 38 are oriented in a manner such that forward movement of the vehicle will cause the wheels to extend, while rearward movement will cause them to retract. The latter is believed preferable to the extent that once the vehicle is transported through a narrow passageway, an immediate extension of the wheel assemblies is afforded for stability as the vehicle leaves the passageway, thus avoiding necessity of movement forward far enough from the passageway to permit subsequent rearward movement for extension.

Also, in the preferred embodiment the plate 62 and release button 64, which control actuation and release of the device 40, are not dependent in their operation upon the relative travel positions of screw threaded portions 36 and 38 with each other. Thus, retraction or extension of the axles 28 may be stopped or begun at any position of travel of the axles at the desire and convenience of the operator.

As envisioned hereunder, the device 40 is also designed to contain an automatic release feature at the limits of axle travel. Thus, whenever the screw threaded portion 36 of the axle 28 reaches the limit of its travel within the matingly threaded portion 38 of the vehicle frame 14, the axle threaded portion 36 will "bottom out" and abruptly stop the axle 28 and hence the wheel 26 (when in the clutched condition) from rotation. Rotational inertia of the moving vehicle, however, will operate to cause the inboardward end 68 (FIG. 2) of the coupling sleeve 48 to be forced out of the detent 68 via the cam surfaces 66 therein. In the preferred form, the force of the spring 54 (FIG. 3) on the plunger 52 will be such that the spring force may be overcome by such a force on the inboardward end 68, and the device 40 will snap into the disengaged position of FIG. 4.

Although a single preferred embodiment has been detailed and described herein, many variations of the invention are envisioned to fall within the scope of the appended claims.

What is claimed is:

1. A device for selectively clutching a wheel to an axle of a vehicle for axial retraction and extension of said wheel and axle relative to said vehicle, the wheel including a hub rotatably secured on the axle, said axle including an axle flange, said device fixed to said hub for providing operative connection of said wheel with said axle flange, said device comprising:
   (a) a housing disposed for affixation to said hub of said wheel, said housing including a detent,
   (b) a coupling sleeve axially movable within said housing, said sleeve having a bore registrable with said detent,
   (c) a spring loaded plunger having a cam disposed for axial movement within said coupling sleeve,
   (d) a ball carried within said bore, and releasably urged into said detent by said cam of said plunger, said sleeve defining a transversely extending inboard end disposed for engaging the axle flange and thereby clutching said wheel while said ball is held in said detent by said plunger, (e) an actuator plate affixed to the outboard end of said sleeve, said plate being disposed for effecting the retention of said ball in said detent, (f) a release button affixed to the outboard end of said plunger, said button extending axially through said actuator plate, and (g) spring means axially interposed between said actuator plate and said housing, said means operatively urging said plate away from said housing.

2. The device of claim 1 wherein said axle contains screw threads at one end thereof, said one end disposed inboardwardly of said wheel.

3. The device of claim 2 wherein said axle is supported in a vehicular frame at said inboardwardly disposed end of said axle containing said screw threads, wherein said frame provides a receiving bore having mating threads for accommodating said axle screw threads.

4. The device of claim 3 further comprising an actuator plate affixed to the outboard end of said sleeve, said plate being disposed for effecting the retension of said ball in said detent.

5. The device of claim 4 further comprising a release button affixed to the outboard end of said plunger, said button extending axially through said actuator plate.

6. The device of claim 5 further comprising spring means axially interposed between said actuator plate and said housing, said means operatively urging said plate away from said housing.

7. The device of claim 6 wherein said axle flange contains detents disposed for receiving said axle flange engaging end of said sleeve.

8. The device of claim 7 wherein said axle flange is fixed to said axle.

9. The device of claim 8 further comprising retention means on said sleeve for limiting travel of said sleeve whenever said ball is released from said detent.

10. A wheelchair having a pair of opposed wheels, each supported by an axle having a screw threaded portion positioned inboardwardly thereon, each wheel including a hub, each hub comprising a device for selectively clutching one of said wheels to respective axle, each said wheel including a hub rotatably mounted on respective axle, each axle including an axle flange fixed thereto, each device fixed to said respective hub for providing operative connection of said respective wheel with one of said axle flanges, each device comprising:

(a) a housing disposed for affixation to said hub of said wheel, said housing including a detent, (b) a coupling sleeve axially movable within said housing, said sleeve having a bore registrable with said detent, (c) a spring loaded plunger having a cam disposed for axial movement within said coupling sleeve, (d) a ball carried within said bore, and releasably urged into said detent by said cam of said plunger, said sleeve defining a transversely extending axle flange engaging end disposed for clutching said wheel while said ball is held in said detent by said plunger, (e) an actuator plate affixed to the outboard end of said sleeve, said plate being disposed for effecting the retention of said ball in said detent, (f) a release button affixed to the outboard end of said plunger, said button extending axially through said actuator plate, and (g) spring means axially interposed between said actuator plate and said housing, said means operatively urging said plate away from said housing.

11. The clutch device of claim 10 further comprising means for automatic disengagement of said device whenever said screw threaded portion of said respective axle reaches a limit of travel.

12. The clutch device of claim 11 wherein said means for automatic disengagement comprises a detent positioned in each of said axle flanges, said detent including cam surfaces disposed for forcing said transversely extending end of said coupling sleeve out of said detent.

* * * * *